US007865846B2

(12) United States Patent
Kim et al.

(10) Patent No.: US 7,865,846 B2
(45) Date of Patent: *Jan. 4, 2011

(54) DISPLAY DEVICE AND METHOD FOR DRIVING THE SAME

(75) Inventors: Hak Soo Kim, Kyonggi-do (KR); Sung Tae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 745 days.

This patent is subject to a terminal disclaimer.

(21) Appl. No.: 11/633,497

(22) Filed: Dec. 5, 2006

(65) Prior Publication Data

US 2007/0075991 A1 Apr. 5, 2007

Related U.S. Application Data

(63) Continuation of application No. 09/897,611, filed on Jul. 3, 2001, now Pat. No. 7,162,702.

(30) Foreign Application Priority Data

Jul. 4, 2000 (KR) .............................. 2000-38010

(51) Int. Cl.
*G06F 3/048* (2006.01)

(52) U.S. Cl. ...................................... 715/867; 345/211

(58) Field of Classification Search ................. 715/867; 345/211; 382/182
See application file for complete search history.

(56) References Cited

U.S. PATENT DOCUMENTS 5,699,104 A * 12/1997 Yoshinobu .................. 725/27
5,740,549 A 4/1998 Reilly et al. .................. 705/14
6,084,583 A 7/2000 Gerszberg et al. ........... 715/867
6,313,878 B1 11/2001 Jankowiak .................. 348/377
6,353,449 B1 * 3/2002 Gregg et al. ................ 715/762
6,384,852 B1 5/2002 Ye et al. ..................... 715/867
6,401,209 B1 6/2002 Klein ......................... 713/200
6,486,900 B1 11/2002 Shen et al. .................. 715/867
6,507,350 B1 1/2003 Wilson ....................... 345/690
6,522,347 B1 2/2003 Tsuji et al. .................. 345/848
7,162,702 B2 * 1/2007 Kim et al. ................... 715/867
7,231,083 B1 * 6/2007 Cooper et al. .............. 382/162

FOREIGN PATENT DOCUMENTS

EP 0 965 974 A1 12/1999
EP 1 071 071 A2 1/2001
EP 1 071 071 A3 7/2002
JP 06-332418 12/1994
JP 08-292740 11/1996
JP 09-114418 5/1997
WO WO 99/53472 10/1999

* cited by examiner

*Primary Examiner*—Kevin M Nguyen
(74) *Attorney, Agent, or Firm*—Ked & Associates LLP

(57) ABSTRACT

A display device and a method for driving the same are disclosed. The display device confirms whether display data applied to a display panel are uniformly maintained for a predetermined time. As a result of confirmation, if the display data are uniformly maintained for a predetermined time, pixels of the display panel are made for a predetermined block unit so that screen save modes are performed to sequentially apply screen save mode data to pixels of each block. The screen save modes are completed after there are sequentially performed for all blocks on the display panel. Thus, uniform luminance deviation can be obtained on the display panel of the display device and further picture quality of the display device can be improved.

14 Claims, 8 Drawing Sheets

DISPLAY DEVICE AND METHOD FOR DRIVING THE SAME

CROSS-REFERENCE TO RELATED APPLICATIONS

This application is a continuation of U.S. patent application Ser. No. 09/897,611, filed Jul. 3, 2001, now U.S. Pat. No. 7,162,702, issued on Jan. 9, 2007, the contents of which is incorporated herein by reference.

BACKGROUND OF THE INVENTION

1. Field of the Invention

The present invention relates to a display device and a method for driving the same, and more particularly, to a display device and a method for driving the same that can uniformly maintain a degradation deviation of a whole display panel in upper, lower, left, and right directions in a self-luminescent display device.

2. Background of the Related Art

Generally, a display device has a degradation deviation on a display panel by driving the display panel. Recently, self-luminescent display devices, such as a cathode ray tube (CRT), a field emission display (FED), a plasma display panel (PDP), and an electroluminescence (EL), are used as display devices. Since such self-luminescent display devices have a variable screen in view of a graphic screen, certain pixels of a panel are not continuously maintained in turn-on or turn-off state.

However, in a text screen, when the text screen is continuously displayed, some of pixels constituting the text screen can continuously be maintained in turn-on state while other pixels can continuously be maintained in turn-off state.

Therefore, a great difference exists between luminance of pixels continuously maintained in turn-on state and luminance of pixels continuously maintained in turn-off state. In other words, the pixels continuously maintained in turn-on state have a short life due to degradation while the pixels continuously maintained in turn-off state relatively have a long life.

The pixels having different lives deteriorate picture quality of the display device.

To solve such a problem, there is provided a method for prolonging a life of a display panel of a display device by applying an inverse voltage to the display panel. However, this method is made without any noticeable result.

FIG. 1 is a diagram showing a display of a general text type.

Luminance according to lives of pixels continuously maintained in turn-off state in FIG. 1 is shown in an upper graph of FIG. 2. As shown in FIG. 2, it is noted that luminance of pixels continuously maintained in turn-on state according to their operation time is remarkably deteriorated as compared with the pixels continuously maintained in turn-off state.

Meanwhile, the pixels continuously maintained in turn-off state have lower luminance than the pixels continuously maintained in turn-on state. Luminance of pixels continuously maintained in turn-off state according to their operation time is shown in a lower graph of FIG. 2.

In other words, in the pixels continuously maintained in turn-on state, charges continuously move within them. Accordingly, as shown in the lower graph of FIG. 2, the pixels continuously maintained in turn-on state have rapidly deteriorated luminance according to life as compared with the pixels continuously maintained in turn-off state. Further, the pixels continuously maintained in turn-on state have a shorter life than the pixels continuously maintained in turn-off state.

Consequently, the life difference generates luminance difference between the pixels and deteriorates picture quality of the display device.

In other words, if the display device displays a text screen, once the pixels are set up in turn-on or turn-off state, they continuously remain as they are. In this case, luminance difference exists between the turned on pixels and the turned off pixels, thereby remarkably deteriorating picture quality.

SUMMARY OF THE INVENTION

Accordingly, the present invention is directed to a display device and a method for driving the same that substantially obviates one or more problems due to limitations and disadvantages of the related art.

An object of the present invention is to provide a display device and a method for driving the same that can prevent picture quality from being deteriorated.

Another object of the present invention is to provide a display device and a method for driving the same that can minimize a degradation deviation between pixels continuously maintained in turn-on state and pixels continuously maintained in turn-off state.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a display device confirms whether display data applied to a display panel are uniformly maintained for a predetermined time. As a result of confirmation, if the display data are uniformly maintained for a predetermined time, pixels of the display panel are made for a predetermined block unit so that screen save modes are performed to sequentially apply screen save mode data to pixels of each block. The screen save modes are completed after there are sequentially performed for all blocks on the display panel.

Preferably, as a result of confirmation, if the display data are changed for a predetermined time, the display data are recognized as active data such as graphic data. Therefore, the display device directly displays the display data on the display panel without performing the screen save modes.

Preferably, to uniformly maintain picture quality of the display device, the screen save mode data having a predetermined type to be directly applied to the display panel if the display data are not changed for a predetermined time are in advance stored in a memory of the display device.

Preferably, to perform the screen save modes, the pixels can be made for one block unit among a block consisting of a plurality of pixel columns, a block consisting of plurality of pixel rows, and N×M (N, M is a positive integer) pixel block. At this time, screen save mode data designated as turn-on or turn-off are simultaneously applied to all pixels within the same block.

Preferably, to perform the screen save mode, the pixels are divided into one of the column block, the row block, and the N×M block, and an inverse value of the display data is periodically applied to the pixels within each block.

Preferably, as the screen save mode data, certain graphic data can be provided to the display panel at a certain time period to uniformly maintain the degradation state of the whole pixels.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings.

Pixels of a display device may partially be degraded in view of characteristic of the display device. It is necessary to uniformly compensate display quality of whole pixels so as to uniformly maintain display quality of the partially degraded display device.

Figure 1:
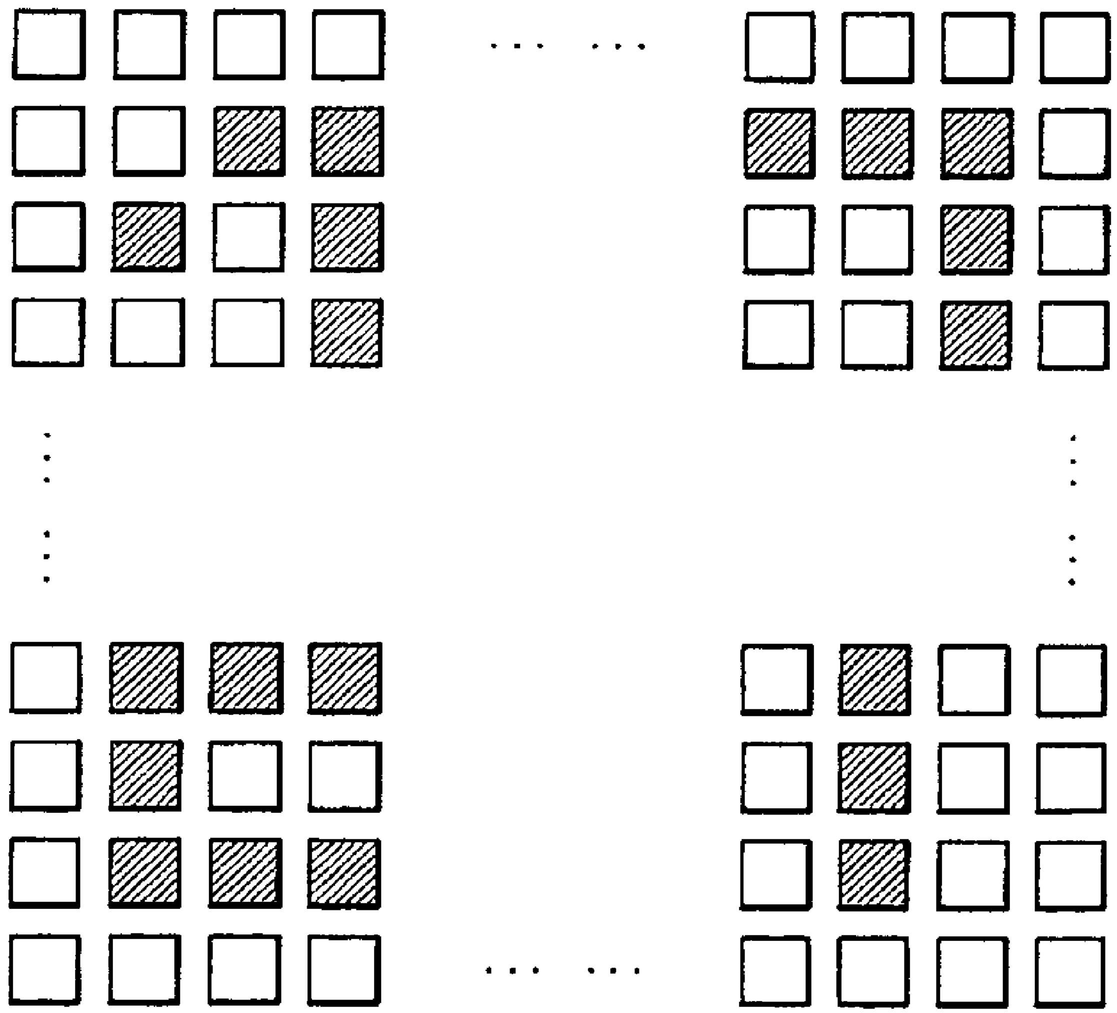
FIG. 1 Related Art
FIG. 1 is a diagram showing a display of a general text type.
Figure 2:
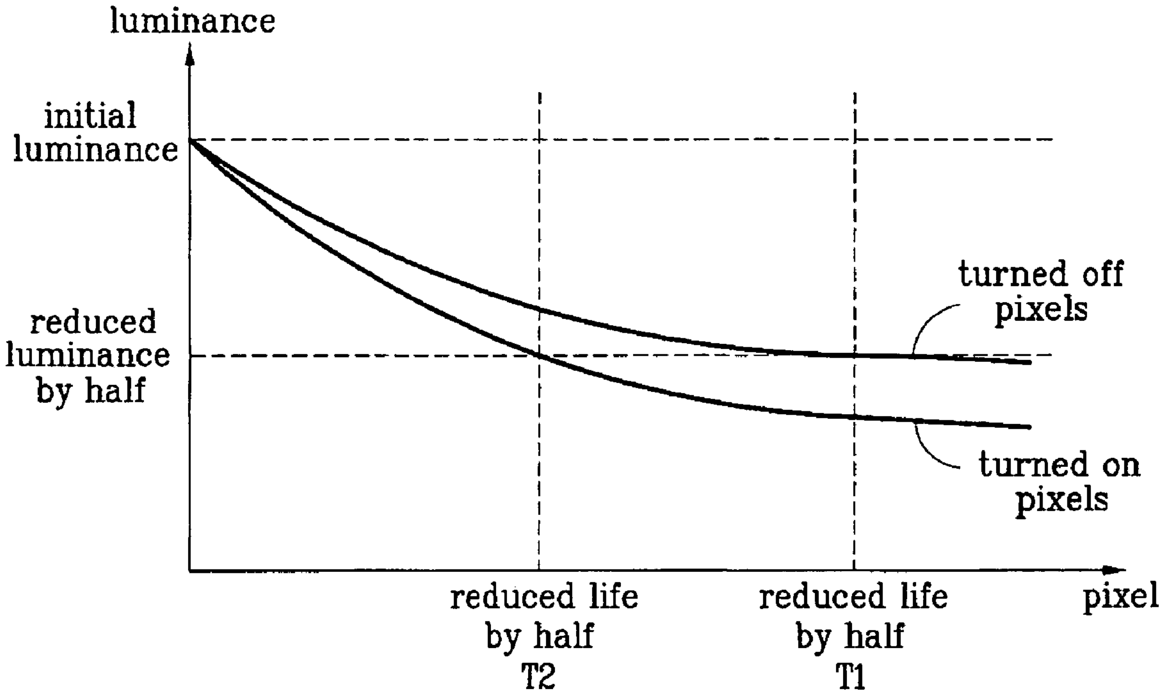
FIG. 2 Related Art
FIG. 2 is a graph showing lives of pixels in the related art.
Figure 3:
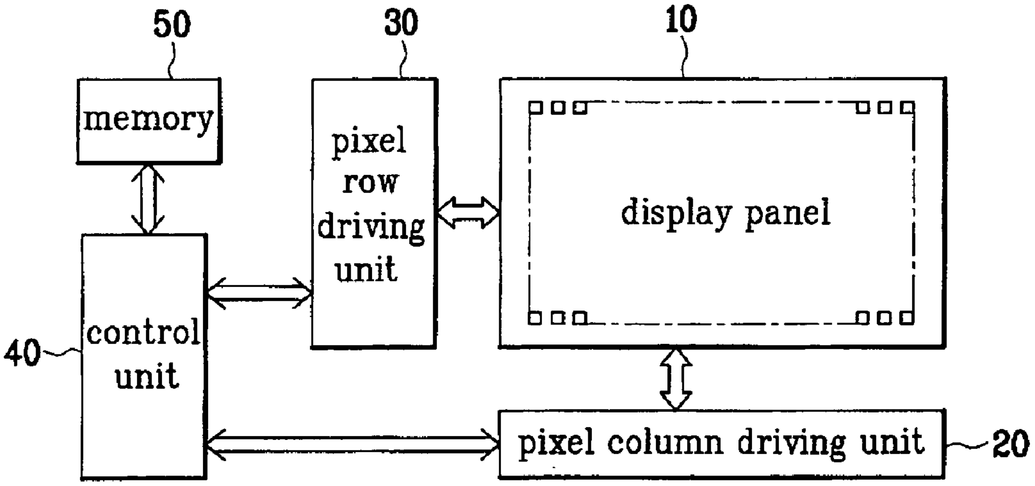
FIG. 3 is a block diagram showing a configuration of a display device according to the present invention.

FIG. 3 is a block diagram showing a configuration of a display device according to the present invention.

Referring to FIG. 3, the display device of the present invention includes a display panel 10 having a plurality of pixels arranged in a column and row unit, a pixel column driving unit 20 for driving the pixels in column, a pixel row driving unit 30 for driving the pixels in row, and a control unit 40 for driving the pixel column driving unit 20 and the pixel row driving unit 30 using a control signal.

The control unit 40 divides the pixels into a predetermined block unit by driving the pixel column driving unit 20 and the pixel row driving unit 30 using the control signal. The control unit 40 performs screen save modes of the display panel for the predetermined block unit.

Meanwhile, a reference numeral 50 which is not described denotes a memory that stores various types of the screen save modes.

The predetermined block for the screen save modes may be one of a column block consisting of at least one pixel column, a row block consisting of at least one pixel row, and N×M pixel block consisting of N×M (N, M is positive integer number) pixels.

The screen save modes may turn on or off all pixels within each block.

In FIG. 3, the control unit 40 confirms whether display data applied to the display panel 10 are uniformly maintained for a predetermined time. If the display data are uniformly maintained for a predetermined time, the control unit 40 divides the display panel 10 into at least one block. The screen save modes are then performed. In other words, the display data and the screen save mode data are sequentially applied from the memory 50 to the one block of the display panel 10 under the control of the control unit 40.

Meanwhile, if the display data are changed to other data during the screen save modes, the control unit 40 releases the screen save modes and displays the display data only on the display panel 10.

If the display data are continuously variable data without being uniformly maintained for a predetermined time, the control unit 40 continuously displays the display data on the display panel 10 without performing the screen save modes.

Inverse data of the display data may be used as the screen save mode data.

First Embodiment

Figure 4A:
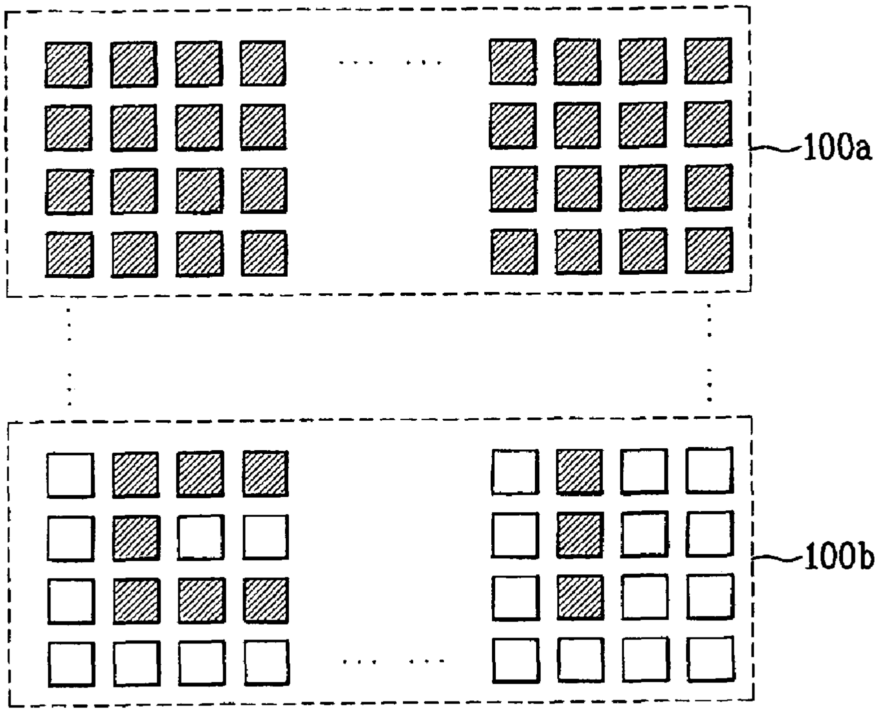
FIGS. 4A and 4B are diagrams showing a screen save mode that turns on pixels for a column block unit.
Figure 4B:
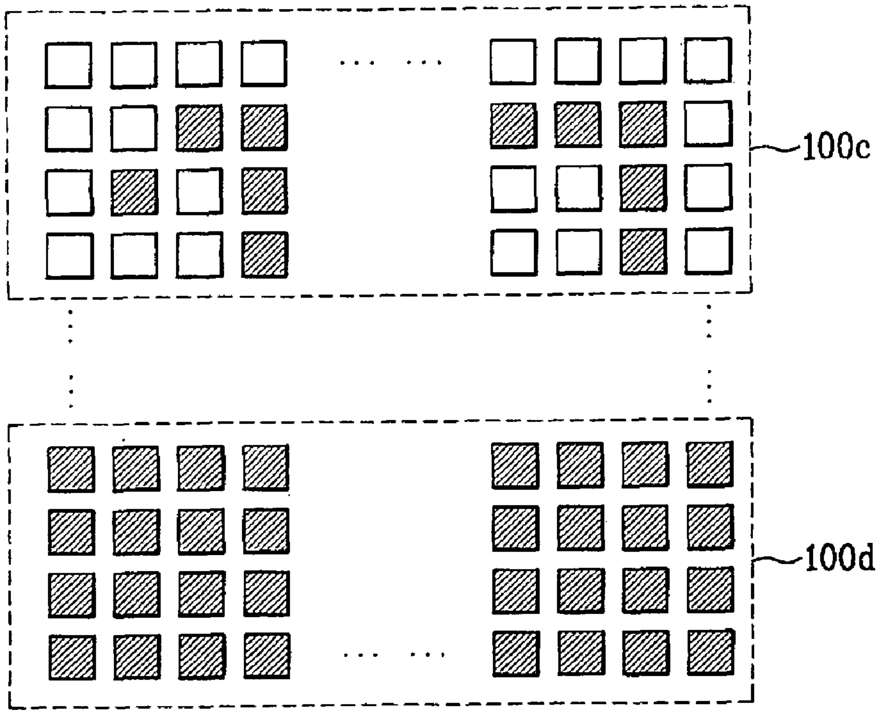

FIGS. 4A and 4B are diagrams showing screen save modes that turn on pixels of a display device for a column block unit.

In FIGS. 4A and 4B, a plurality of columns are regarded as one block unit and pixels are turned on for a block unit, so that the screen save modes are performed.

FIG. 4A shows a first column block 100*a* of the screen save modes implemented for the column block unit, and FIG. 4B shows the last column block 100*d* of the screen save modes implemented for the column block unit.

As shown in FIGS. 4A and 4B, the screen save mode is sequentially applied to each of the column blocks 100*a*-100*d*, and the corresponding columns within the currently chosen column block (100*a* in FIG. 4A and 100*d* in FIG. 4B) are turned on while columns corresponding to the other column blocks (100*b* and 100*c*) are turned off, except for pixels that are displaying display data. These steps are repeated until the screen save modes of all column blocks 100*a*-100*d* are completed.

The control unit 40 confirms whether the display data applied to the display panel 10 are uniformly maintained for a predetermined time. If the display data are uniformly maintained for a predetermined time, the control unit 40 divides the pixels of the display panel 10 into at least one pixel column block 100*a*-100*d*. Then, the screen save modes are sequentially performed on the pixel column blocks 100*a*-100*d*.

The screen save modes mean that pixels corresponding to each pixel column block are simultaneously driven in the same type. When the screen save modes are performed, the same type may be made in such a manner that all pixels within each block are turned on or off.

Meanwhile, if the display data are changed during the screen save modes, the control unit 40 releases the screen save modes and displays the display data only on the display panel 10.

Second Embodiment

Figure 5A:
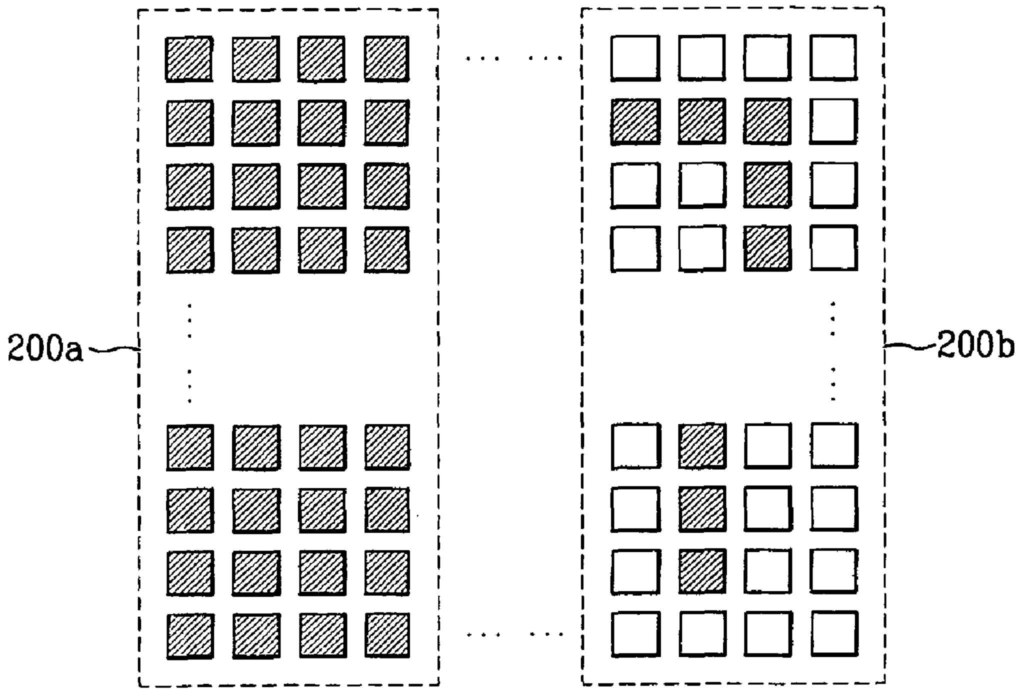
FIGS. 5A and 5B are diagrams showing a screen save mode that turns on pixels for a row block unit.
Figure 5B:
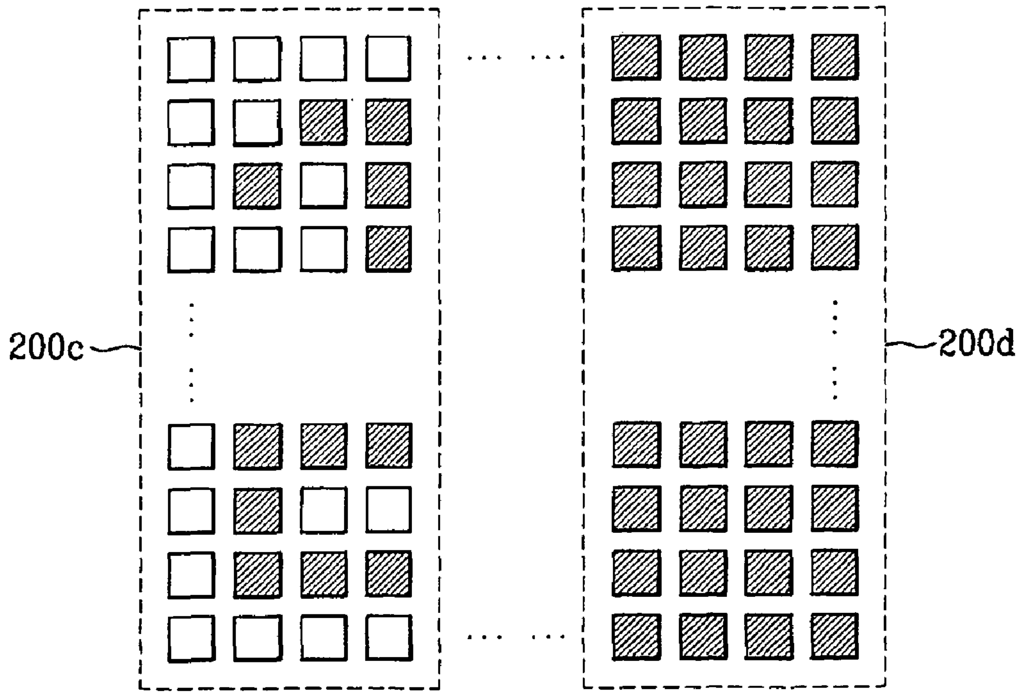

FIGS. 5A and 5B are diagrams showing screen save modes that turn on pixels for a row block unit.

In FIGS. 5A and 5B, a plurality of rows are regarded as one block unit and pixels are turned on for a block unit, so that the screen save modes are performed.

FIG. 5A show a first row block 200*a* of the screen save modes implemented for the row block unit, and FIG. 5B shows the last row block 200*d* of the screen save modes implemented for the row block unit.

As shown in FIGS. 5A and 5B, the screen save mode is sequentially applied to each of the row blocks 200*a*-200*d*, and the corresponding columns within the currently chosen row block (200*a*, FIG. 5A and 200*d* in FIG. 5B) are turned on while rows corresponding to the other row blocks (200*b* and 200*c*) are turned off, except for pixels that are displaying display data. These steps are repeated until the screen save modes of all row blocks 200*a*-200*d* are completed.

The control unit 40 confirms whether the display data applied to the display panel 10 are uniformly maintained for a predetermined time. If the display data are uniformly maintained for a predetermined time, the control unit 40 divides the pixels of the display panel 10 into at least one pixel row block 200*a*-200*d*. Then, the screen save modes are sequentially performed on the pixel row blocks 200*a*-200*d* by the control unit 40.

The screen save modes mean that pixels corresponding to each pixel row block are simultaneously driven in the same type.

Meanwhile, if the display data are changed during the screen save modes, the control unit 40 releases the screen save modes and displays the display data only on the display panel 10.

The screen save modes for the row block unit are useful for display devices that perform display for a character unit. In this case, a user can manipulate the display device for the screen save mode for the row block unit without reducing viewing sensitivity when viewing a screen displayed in the display device.

Third Embodiment

Figure 6A:
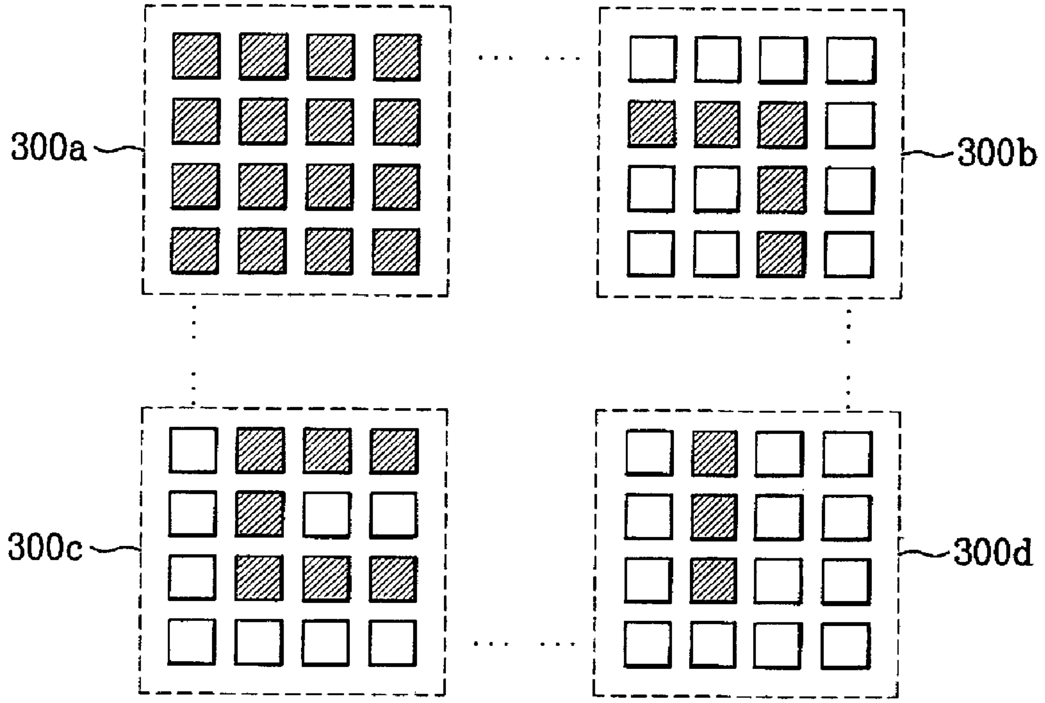
FIGS. 6A and 6B are diagrams showing a screen save mode that turns on pixels for N×M block unit.
Figure 6B:
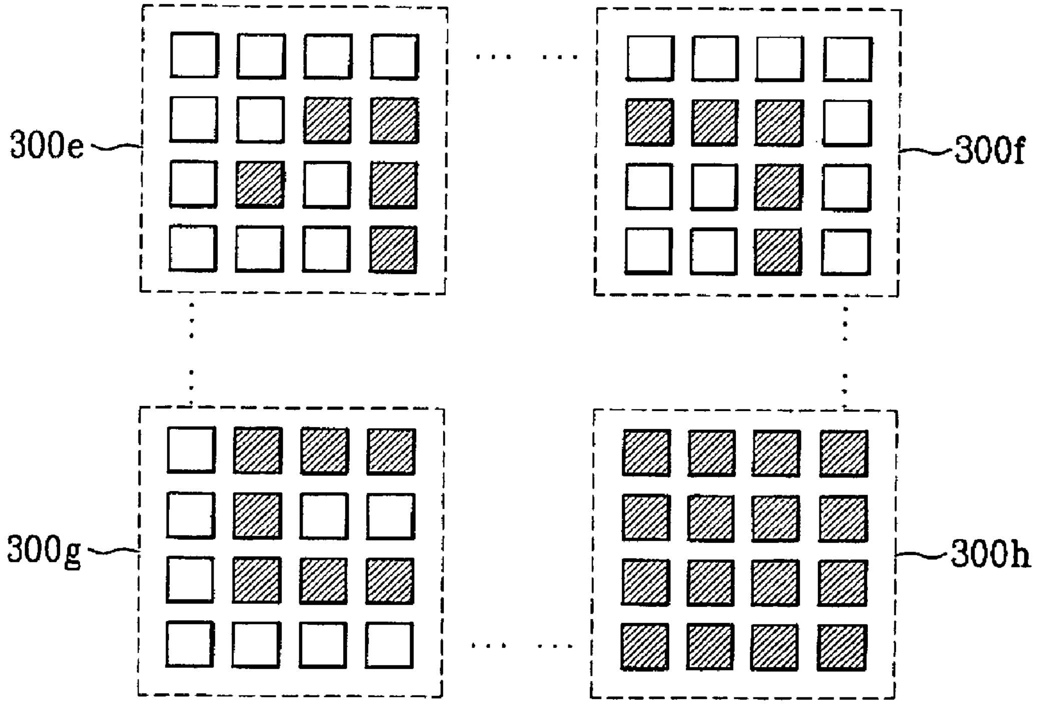

FIGS. 6A and 6B are diagrams showing screen save modes that turn on pixels for N1×M1 block unit.

FIG. 6A show a first N1×M1 pixel block 300*a* of the screen save modes implemented for a certain pixel block unit, and FIG. 6B shows the last N1×M1 pixel block 300*h* of the screen save modes implemented for the certain pixel block unit.

Pixels of the currently chosen N1×M1 pixel block (300*a* in FIG. 5A and 300*h* in FIG. 6B) are turned on while pixels of the other N×M pixel blocks 300*b*-300*g* are turned off, except for pixels that are displaying display data. These steps are repeated until the screen save modes of all N1×M1 pixel blocks 300*a*-300*h* are completed.

The control unit 40 confirms whether the display data applied to the display panel 10 are uniformly maintained for a predetermined time. If the display data are uniformly maintained for a predetermined time, the control unit 40 divides the pixels of the display panel 10 into at least one N1×M1 (N1 and M1 are positive integers) pixel row block 300*a*-300*h*. The screen save mode is then sequentially performed on the N1×M1 pixelblocks 300*a*-300*h*.

At this time, the screen save modes mean that pixels corresponding to each N1×M1 pixel block are simultaneously driven in the same type.

Meanwhile, if the display data are changed during the screen save modes, the control unit 40 releases the screen save mode and displays the display data only on the display panel 10.

When the screen save modes are performed, the same type may be made in such a manner that all pixels within each block are turned on or off.

Figure 7:
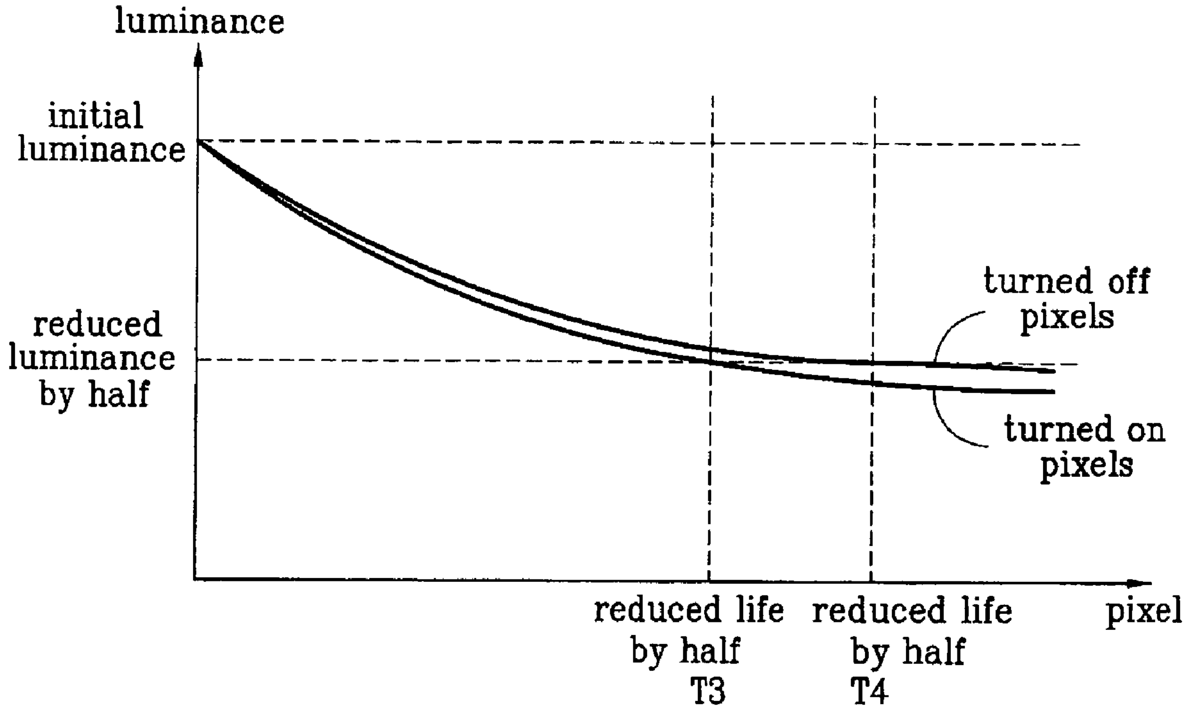
FIG. 7 is a graph showing lives of pixels according to the present invention.

FIG. 7 is a graph showing lives of pixels according to the present invention.

In FIG. 7, a graph at an upper portion shows lives of the pixels of the display device when the screen save modes are performed on the display device for the pixel block unit while a graph at a lower portion shows lives of pixels when the pixels of the display device are continuously turned on without performing the screen save modes.

As shown in FIG. 7, in the screen save modes of the present invention, it is noted that luminance difference according to a life reduced by half between the pixels continuously maintained in turn-on state and the pixels continuously maintained in turn-off state is not great. Accordingly, it is noted that picture quality of the display device can be improved.

Figure 8A:
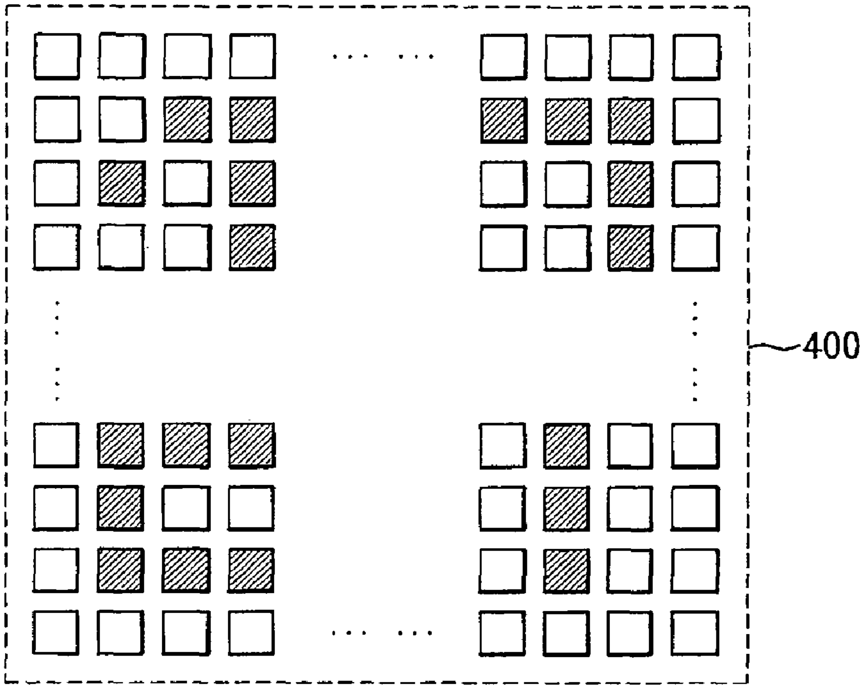
FIGS. 8A and 8B are diagrams showing a screen save mode using inverse data.
Figure 8B:
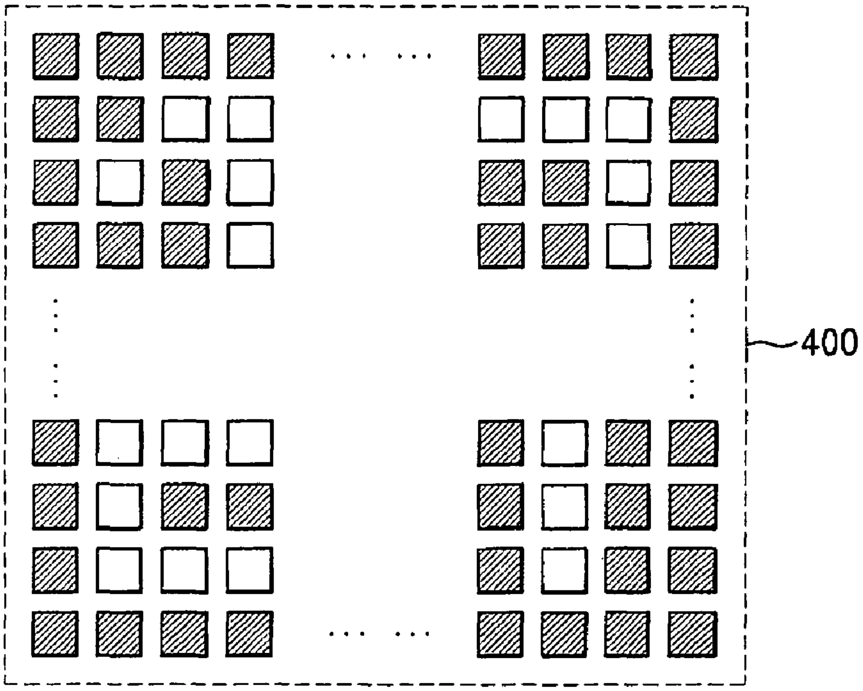

FIG. 8A is a diagram showing a screen when the display device is in a general display state while FIG. 8B is a diagram showing a screen when turned on pixels and turned off pixels are inversed on the screen.

FIGS. 8A and 8B, the control unit 40 confirms whether the display data applied to the display panel 10 are uniformly maintained for a predetermined time. If the display data are uniformly maintained for a predetermined time, the control unit 40 divides the pixels of the display panel 10 into at least one pixel block 400. Then, the control unit 40 sequentially applies the screen save mode data to the at least one pixel block 400.

The screen save mode data are inverse data of data corresponding to each pixel block of the display data.

Meanwhile, the block for the screen save modes may be one of a column block consisting of at least one pixel column, a row block consisting of at least one pixel row, and a pixel block consisting of N×M(N and M are positive integers) pixels.

The screen save mode data are to turn off the pixels turned on according to the display data among the pixels belonging to each pixel block and at the same time to turn on the pixels turned off according to the display data among the pixels belonging to each pixel block.

As described above, when the pixel data of the current screen and their inverse data are provided to the screen of the display device, graphs on lives of the pixels of the display device are equal to the graph at the upper portion of FIG. 7. Accordingly, the display panel of the display device has improved picture quality.

Figure 9:
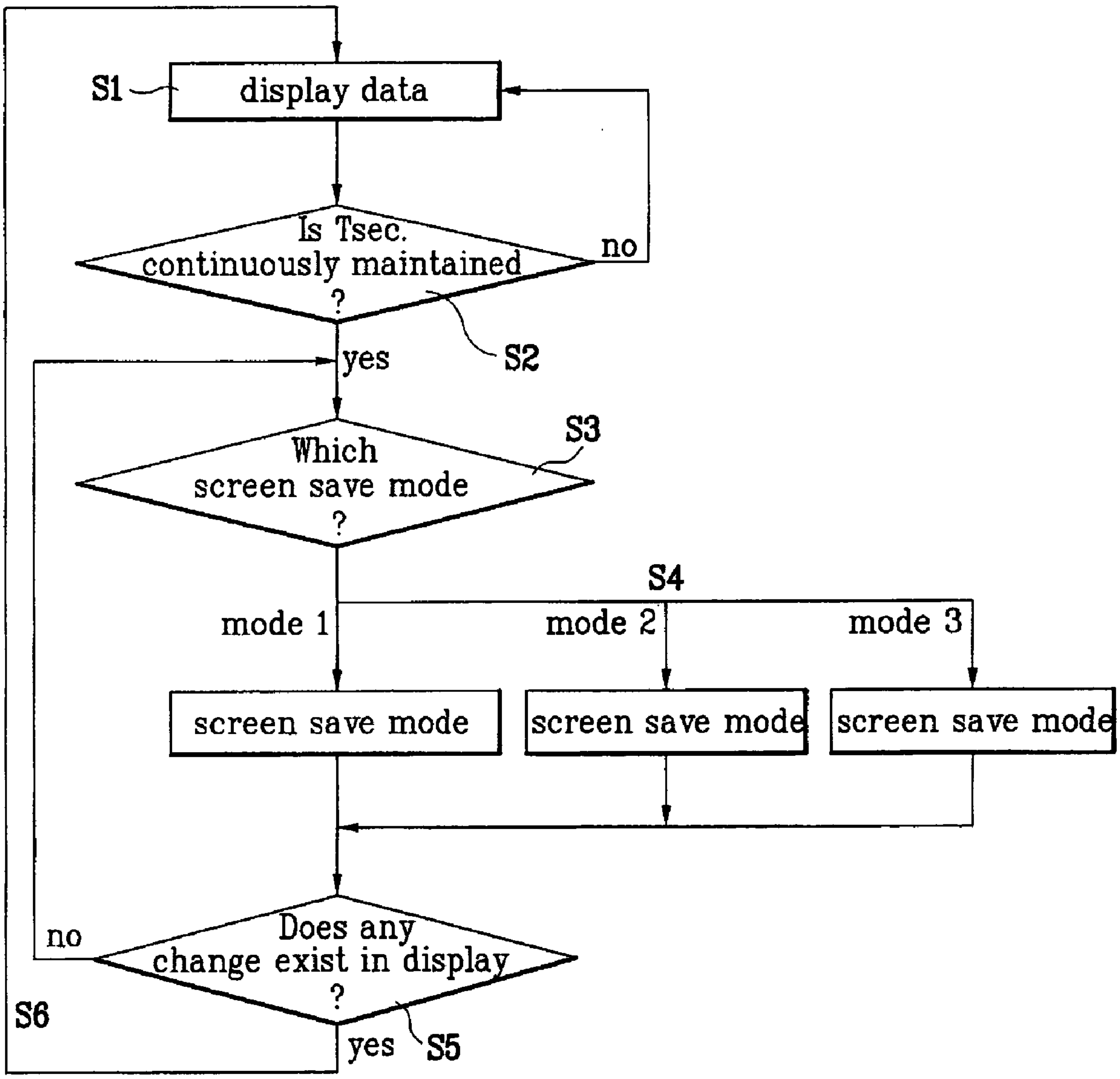
FIG. 9 is a flow chart showing a step of compensating degradation of a display device according to the present invention.

FIG. 9 is a flow chart showing steps of compensating degradation deviation of the display device according to the present invention.

If data are displayed on the display panel of the display device (S1), the control unit 40 of the display device confirms whether the display data are uniformly maintained for a predetermined time (T sec.) without any change (S2). If the display data are continuously changed, the display device continuously performs the display step under the control of the control unit 40. Meanwhile, if it is determined that the display data are continuously displayed on the screen for a predetermined time, the display device is subject to the screen save modes according to the present invention under the control of the control unit 40.

The screen save modes may be implemented in various types. These various types are previously divided and then stored in the memory of the display device. Also, the types of the screen save modes are previously designated by a user or manufacturer. The display device performs the screen save modes of the previously designated types as above. As an example, the first screen save mode is implemented for a column block unit, the second screen save mode is implemented for a row block unit, and the third screen save mode is implemented for a pixel block unit (S4).

Meanwhile, it is confirmed whether the display data are changed during the screen save modes (S5). If the display data are changed, the screen save modes are directly ended by the control unit 40 and the display device displays the display data on the screen (S6).

As aforementioned, the driving method of the display device according to the present invention has the following advantages.

First, turn-on state and turn-off state of a plurality of the pixels to which the same data are successively applied for a predetermined time are switched so that the pixels can uniformly be turned on over the whole screen.

Furthermore, by periodically applying inverse data of current video data to the whole pixels constituting the screen, luminance deviation can uniformly be maintained at a small range between the pixels over the whole screen of the display panel. As a result, it is possible to improve picture quality of the screen.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for driving a display device having a display panel, comprising:

determining whether or not a screen saver mode is to he performed;

dividing the display panel into a plurality of blocks of pixels or sub-pixels if the screen saver mode is to be performed; and applying screen saver mode data to either turn on or off pixels or sub-pixels in the plurality of blocks or to invert display data for pixels or sub-pixels in the plurality of blocks, wherein:

the screen saver mode data are applied to the plurality of blocks sequentially, the screen saver mode data is used to turn on or off all the pixels in at least one of the plurality of blocks while all the pixels in remaining ones of the plurality of blocks are simultaneously turned off or on respectively, except for pixels are displaying display data, and the plurality of blocks have substantially a same on time period and substantially a same off time period.

2. The method of claim 1, wherein said determining includes:

confirming whether display data for the display panel has been maintained for a predetermined time, the screen saver mode to be performed in response to said confirmation.

3. The method of claim 1, wherein the plurality of blocks include any one of:

column blocks including at least one pixel or sub-pixel column, row blocks including at least one pixel or sub-pixel row, or N1×M1 blocks of pixels or sub-pixels, where N1 and M1 are positive integers.

4. The method of claim 3, wherein each of the N1×M1 blocks is an 11×12 block or a 6×12 block of pixels or sub-pixels.

5. The method of claim 1, further comprising:

releasing the screen saver mode when the display data is changed during the screen save mode; and displaying the display data only on the display panel.

6. The method of claim 1, further comprising:

displaying the display data on the display panel without performing the screen saver mode, when the display data is changed without being maintained for a predetermined time.

7. The method of claim 1, wherein inverse data of the display data are applied during the screen saver mode.

8. The method of claim 1, further comprising:

performing a plurality of different screen saver modes sequentially for the plurality of blocks.

9. The method of claim 8, wherein the different screen saver modes include:

a first screen saver mode to turn on or off all pixels or sub-pixels in a column of one or more of the blocks, the column including at least one pixel or sub-pixel column;

a second screen saver mode to turn on or off all pixels or sub-pixels in a row of one or more of the blocks, the row including at least one pixel or sub-pixel row;

a third screen saver mode to turn on or off all pixels or sub-pixels in N1×M1 blocks of pixels or sub-pixels, wherein N1 and M1 are positive integers; or a fourth screen saver mode to invert display data for all the pixels or sub-pixels in the plurality of blocks.

10. A method for driving a display device having a display panel, comprising:

determining whether or not a screen saver mode is to be performed;

selecting at least one screen saver mode from a plurality of different screen saver modes, if a screen save mode is determined to be performed;

dividing the display panel into a plurality of block of pixels or sub-pixels based on the selected screen saver mode; and applying screen saver mode data to turn on or off pixels or sub-pixels in the plurality of blocks or to invert display data for pixels or sub-pixels in the plurality of blocks, wherein:

the screen saver mode data are applied to the plurality of blocks sequentially, the screen saver mode data is used to turn on or off all the pixels in at least one of the plurality of blocks while all the pixels in remaining ones of the plurality of blocks are simultaneously turned off or on respectively, except for pixels are displaying display data, and the plurality of blocks have substantially a same on time period and substantially a same off time period.

11. The method of claim 10, wherein the different screen saver modes are sequentially performed for the pixels or sub-pixels in the plurality of blocks.

12. The method of claim 11, wherein the different screen saver modes include:

a first screen saver mode to turn on or off all pixels or sub-pixels in a column of one or more of the blocks, the column including at least one pixel or sub-pixel column;

a second screen saver mode to turn on or off all pixels or sub-pixels in a row of one or more of the blocks, the row including at least one pixel or sub-pixel row;

a third screen saver mode to turn on or off all pixels or sub-pixels in N1×M1 blocks of pixels or sub-pixels, wherein N1 and M1 are positive integers; or a fourth screen saver mode to invert display data for all the pixels or sub-pixels in the plurality of blocks.

13. The method of claim 10, wherein said determining includes:

confirming whether display data for the display panel has been maintained for a predetermined time, the screen saver mode to be performed in response to said confirmation.

14. A method for driving a display device having a display panel, comprising:

determining whether or not a screen saver mode is to be performed;

dividing the display panel into a plurality of blocks of pixels or sub-pixels if the screen saver mode is to be performed; and applying screen saver mode data to either turn on or off pixels or sub-pixels in the plurality of blocks or to invert display data for pixels or sub-pixels in the plurality of blocks, wherein:

the screen saver mode data are applied to the plurality of blocks sequentially, the screen saver mode data is used to turn on or off all the pixels in at least one of the plurality of blocks while all the pixels in remaining ones of the plurality of blocks are controlled to simultaneously display display data that existed just before the screen saver mode is performed, and the plurality of blocks have substantially a same on time period and substantially a same off time period.

* * * * *